United States Patent
Efrat et al.

(10) Patent No.: US 10,293,388 B2
(45) Date of Patent: May 21, 2019

(54) METHOD OF CLEANING AN EVAPORATOR

(71) Applicant: IDE TECHNOLOGIES LTD, Kadima (IL)

(72) Inventors: Tomer Efrat, Givatayim (IL); Itamar Hite, Jerusalem (IL)

(73) Assignee: IDE TECHNOLOGIES LTD, Kadima (IL)

( * ) Notice: Subject to any disclaimer, the term of this patent is extended or adjusted under 35 U.S.C. 154(b) by 23 days.

(21) Appl. No.: 15/566,958

(22) PCT Filed: Apr. 13, 2016

(86) PCT No.: PCT/IB2016/052099
§ 371 (c)(1),
(2) Date: Oct. 16, 2017

(87) PCT Pub. No.: WO2016/166676
PCT Pub. Date: Oct. 20, 2016

(65) Prior Publication Data
US 2018/0093307 A1     Apr. 5, 2018

(30) Foreign Application Priority Data
Apr. 15, 2015 (GB) ................................... 1506376.1

(51) Int. Cl.
| | |
|---|---|
| F28G 1/12 | (2006.01) |
| B08B 17/04 | (2006.01) |
| B08B 7/00 | (2006.01) |
| F28F 19/02 | (2006.01) |
| B01D 1/00 | (2006.01) |
| C02F 1/04 | (2006.01) |

(Continued)

(52) U.S. Cl.
CPC ............ B08B 17/04 (2013.01); B01D 1/0082 (2013.01); B08B 7/0014 (2013.01); C02F 1/042 (2013.01); F28F 19/02 (2013.01); F28G 9/00 (2013.01); F28G 13/00 (2013.01); F28G 13/005 (2013.01)

(58) Field of Classification Search
CPC ..... B08B 17/04; B08B 7/0014; F28G 13/005; F28G 9/00; F28G 13/00; B01D 1/0082; C02F 1/042; F28F 19/02
See application file for complete search history.

(56) References Cited

U.S. PATENT DOCUMENTS

| | | | | |
|---|---|---|---|---|
| 3,470,678 A | * | 10/1969 | Schumacher | B04C 5/20 |
| | | | | 55/434.1 |
| 3,671,404 A | * | 6/1972 | Meckler | B01J 37/20 |
| | | | | 202/176 |

(Continued)

*Primary Examiner* — Claire Rojohn, III
(74) *Attorney, Agent, or Firm* — Symbus Law Group LLC; Clifford D. Hyra

(57) ABSTRACT

A method of cleaning an evaporator that includes at least one heat transfer element for the evaporation of water, comprising forming a sacrificial layer of a first material on a surface of the heat transfer element (1); evaporating water that includes a second material to deposit the second material on top of the sacrificial layer (2, 3); and cleaning the evaporator by removing both the sacrificial layer formed on the heat transfer element and the second layer formed on top of the sacrificial layer; wherein the first material is more easily removed from the heat transfer element than the second material (4).

14 Claims, 4 Drawing Sheets

(51) Int. Cl.
*F28G 9/00* (2006.01)
*F28G 13/00* (2006.01)

(56) References Cited

U.S. PATENT DOCUMENTS

| | | | | | |
|---|---|---|---|---|---|
| 3,801,284 | A | * | 4/1974 | Meckler | B01J 37/20 202/176 |
| 4,071,311 | A | * | 1/1978 | Errington | F16L 59/12 432/234 |
| 4,368,776 | A | * | 1/1983 | Negita | F28D 1/05333 165/133 |
| 4,444,675 | A | * | 4/1984 | Goeldner | C02F 1/042 203/7 |
| 4,456,635 | A | * | 6/1984 | Albanese | B08B 17/02 134/22.13 |
| 4,554,967 | A | * | 11/1985 | Johnson | F28F 19/00 122/367.1 |
| 5,070,938 | A | * | 12/1991 | Mizuno | C09D 5/14 165/133 |
| 5,201,119 | A | * | 4/1993 | Mizuno | C09D 5/14 165/133 |
| 5,405,509 | A | * | 4/1995 | Lomasney | B01J 47/08 204/515 |
| 5,511,609 | A | * | 4/1996 | Tyler | F22B 37/107 122/DIG. 13 |
| 6,065,532 | A | * | 5/2000 | Brownlee | F22B 37/107 122/DIG. 13 |
| 6,612,366 | B1 | * | 9/2003 | Chuang | F28F 19/002 122/DIG. 13 |
| 6,971,169 | B2 | * | 12/2005 | Terashima | F22B 37/108 122/510 |
| 7,066,242 | B1 | * | 6/2006 | Ranville | F22B 37/107 165/134.1 |
| 2005/0163994 | A1 | * | 7/2005 | Rouppert | B05D 5/00 428/339 |
| 2006/0193991 | A1 | * | 8/2006 | Ghosoph | B08B 17/04 427/421.1 |
| 2008/0099154 | A1 | * | 5/2008 | Minnich | C02F 1/048 159/47.3 |
| 2008/0317949 | A1 | * | 12/2008 | Edgington | B08B 7/0014 427/154 |
| 2009/0242177 | A1 | * | 10/2009 | Morioka | C09D 1/00 165/133 |
| 2010/0258275 | A1 | * | 10/2010 | Koenig | F28B 1/06 165/95 |
| 2012/0006670 | A1 | * | 1/2012 | Kamen | B01D 1/0082 202/185.1 |
| 2012/0118722 | A1 | * | 5/2012 | Holtzapple | B01D 1/12 203/11 |
| 2014/0027270 | A1 | * | 1/2014 | Valls Angles | B29C 33/04 204/196.01 |
| 2015/0122631 | A1 | * | 5/2015 | James | B01D 1/0082 203/1 |
| 2017/0088452 | A1 | * | 3/2017 | Kim | B01D 1/065 |
| 2018/0093307 | A1 | * | 4/2018 | Efrat | B08B 7/0014 |

* cited by examiner

METHOD OF CLEANING AN EVAPORATOR

This invention relates to evaporators, in particular to a method of cleaning an evaporator to improve its efficiency.

TECHNICAL FIELD

Different types of evaporators having heat transfer elements are used in water treatment processes. Mechanical and thermal vapor compression evaporators are used for the desalination of sea water. Desalination of water is a process in which various soluble materials, such as salt and contaminants, are removed from water containing these materials to provide clean, usually potable, water.

One example of an evaporator known in art is shown in FIG. 1A of the accompanying drawings. The evaporator is a multi-effect evaporator 100 used in a thermal desalination process and comprises has horizontal round tubes 110 to provide falling-film evaporative condensers in a serial arrangement. Feed 90A, entering each effect 101, is introduced as a thin falling film 90 onto outer surface of the tubes and vapor 85A flows internally through tubes 110 in an inner space. As vapor 85A condenses, feed 90A from film 90 evaporates and the vapor is introduced into tubes 110 of next effect 101. Condensate 81 is collected from tubes 110, while brine 82 is collected from film 90 after flowing over all tubes 110.

FIG. 1B shows a schematic illustration of a different type of evaporator known in the art used in mechanical vapor compression (MVC) techniques. MVC comprises an evaporator 100 receiving sea water feed 90A that is pre-heated by exchanging heat with exiting product 81 and brine 82 in a heat exchanger 87 and in a condenser 88. Water 90 is consecutively introduced as a falling film upon round tubes 110 one effect 101 after the other. In each effect 101 the falling film is produced by residual water from the former effect, while vapor from the former effect condenses within tubes 110. Vapor is removed and compressed by a compressor 86 to be reintroduced into the first effect. Condensate 81 and residual brine 82 are then removed from evaporator 100.

The MVC process is based on the application of the principle of a heat pump, which continuously recycles and keeps the latent heat exchanged in the evaporation-condensation process within the system, instead of using steam for effecting the evaporation as in MED systems. The evaporation-condensation process takes place in equipment similar to that used in the MED process. Tubes utilized in the evaporators in MED and MVC processes are usually made of aluminum alloys, which have high heat transfer coefficients required for the MED and MVC processes, allowing to keep the evaporators' size as small as possible, i.e. the higher the heat transfer coefficients, the smaller the size of the evaporator.

Due to high temperatures at which the aluminium alloy tubes are used in the above systems and the presence of salt and contaminants in the water to be desalinated, the quality of these tubes' surface which is in contact with the water deteriorates in time as a result of corrosion and scale precipitation, thereby reducing the heat transfer coefficients. When corrosion and scaling reach certain predetermined levels, cleaning of the tubes is required. In particular, in MED and MVC systems, the tubes are normally cleaned when the reduction of their heat transfer coefficient reaches approximately 10% from its original value.

Scale formation on heat transfer surfaces remains one of the most severe problems in the design and operation of multiple-effect distillers for seawater desalination, having a highly deleterious effect on the specific energy consumption and production capacity. Prior art measures to address this problem, such as over-sizing of the heat transfer surface, scale mitigation measures (for example, including a de-scaling material within the water) and cleaning methods have met with only limited success and production losses during planned shutdown for cleaning the heat exchanger elements, continues to create substantial capital, operating and maintenance costs.

It is an aim of the present invention is to provide a method of improving the efficiency of an evaporator that overcomes, or at least alleviates the above mentioned drawbacks in the art.

SUMMARY OF THE INVENTION

Accordingly, the present invention provides a method of cleaning an evaporator that includes at least one heat transfer element for the evaporation of water, the method comprising:
  forming a sacrificial layer of a first material on a surface of the heat transfer element;
  evaporating water that includes a second material to deposit the second material on top of the sacrificial layer; and
  removing both the sacrificial layer formed on the heat transfer elements and the second layer formed on top of the sacrificial layer;
  wherein the first material is more easily removed from the heat transfer elements than the second material.

The second material comprises scale forming deposits that are present in the fluid being evaporated by the evaporator, such as sulfates and silicas. The first material may comprise any suitable substance that can be deposited onto the surface of the heat transfer element and be more easily removed therefrom than the scale forming deposits Preferably, the evaporator itself evaporates water that includes the second material, while a second layer of the second material is formed on top of the sacrificial layer.

The step of forming the sacrificial layer on the surface of the evaporator heat transfer elements may comprise supplying water to an evaporator in operation, wherein the supplied water includes the first material in supersaturation, until the sacrificial layer is formed in a desired thickness. Preferably, upon reaching the desired thickness, further water is supplied to the evaporator that includes the first material, wherein the supplied further water is at least one of a) not in supersaturation with the first material and b) treated to reduce or avoid precipitation.

Precipitation of the first material to form the sacrificial layer may be facilitated by raising a pH level of the supplied water comprising the first material. Preferably, the pH is raised to above 9. Additionally or alternatively, the pH is raised to provide a Langelier Saturation Index (LSI) that is greater than 0.

It is to be appreciated that the first material may be added to the supplied water to increase its concentration and facilitate precipitation of the first material.

Alternatively or additionally, precipitation of the first material may be facilitated by controlling the temperature difference between an inner side of the heat transfer element in the evaporator and the outer side of the heat transfer element. More preferably, controlling the heat transfer comprises controlling the temperature of at least one of the heat transfer elements, a vapor that is being created during the operation of the evaporator, and the supplied water comprising the first material. Controlling the heat transfer may include controlling the period of time during which operations in the evaporator take place.

Accordingly, in a preferred embodiment of the present invention the method further comprises facilitating precipitation of the first material by at least one of raising a pH level of the supplied water, adding the first material to the supplied water to increase its concentration, and adjusting a temperature of the supplied water.

Preferably, the first material forming the sacrificial layer comprises at least one of: a carbonate, bicarbonate, calcium or magnesium.

One or a number of methods may be used to remove the sacrificial layer and the second layer from the heat transfer element.

Removal of the sacrificial layer and the second layer may comprise supplying a chemical cleaner, wherein the chemical cleaner penetrates through the second layer to reach the sacrificial layer and remove the sacrificial layer from the heat transfer elements, thus removing all layers from the heat transfer elements into circulated water.

The method may further comprise removing from the circulated water the layers removed from the heat transfer elements using in-line filters installed on a circulation line.

Additionally, or alternatively, the removal of the sacrificial layer and the second layer comprises:
  stopping operation of the evaporator; and
  cooling the heat transfer elements whereby the elements contract causing the first material forming the sacrificial layer to break and fall from the heat transfer elements together with the second layer of material.

Preferably, the method further comprises removing the sacrificial layer of material and the second layer of material that have broken and fallen from the evaporator from the chamber where the evaporator is located, for example, using an in-line filter.

Once the sacrificial layer of material and the second layer of material that have broken and fallen from the evaporator have been removed from the chamber where the evaporator is located, the method includes the step of restarting operation of the evaporator. It is to be appreciated that the method according to the invention may then be repeated to provide for enhanced cleaning and operating efficiency of the evaporator.

BRIEF DESCRIPTION OF THE DRAWINGS

Embodiments of the invention shall now be described, by way of example only, with reference to the accompanying drawings in which.

DETAILED DESCRIPTION

Figure 1A:
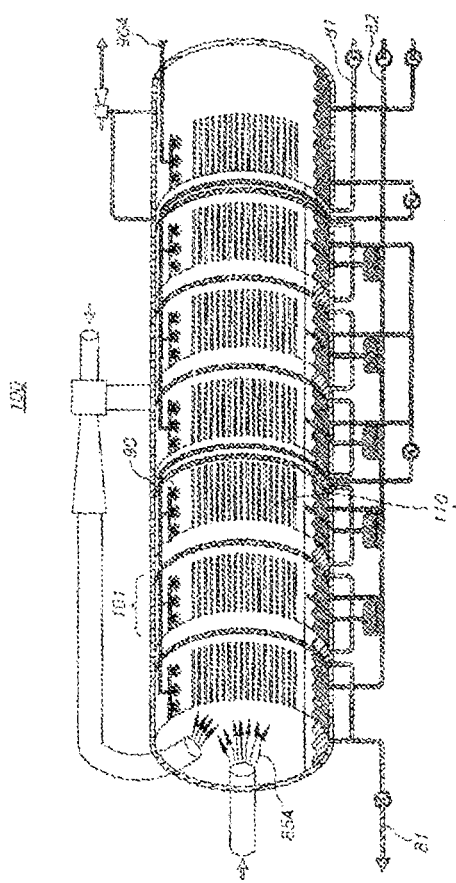
FIGS. 1A and 1B are schematic diagrams of evaporators for use in desalination processes according to the prior art.
Figure 1B:
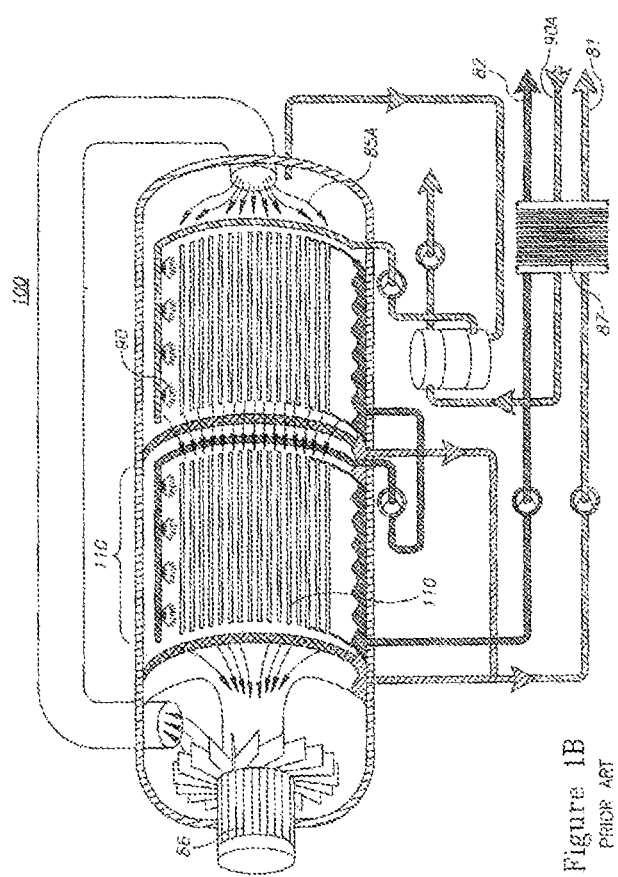
Figure 2:
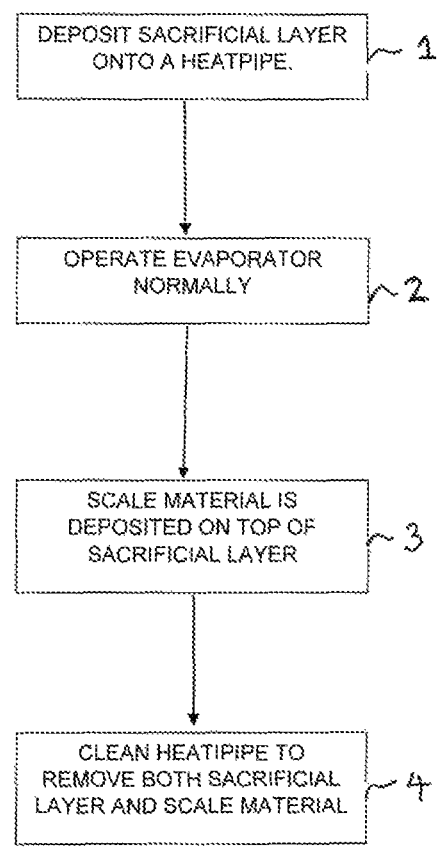
FIG. 2 is a flow diagram illustrating the basic steps of the method according to the present invention.

The present invention provides an improved method for affecting cleaning of heat transfer pipes within an evaporator, such as those used in seawater desalination plants and shown in FIGS. 1A and 1B. Conventionally, hard scale deposits, such as sulfates and silicas, build up on the surface of the heat transfer elements during the evaporation process and are difficult to remove. The invention seeks to address this problem. The basic steps of the method are set out in FIG. 2 of the accompanying drawings. A sacrificial layer is deposited on to the surface of the pipes (step 1) prior to the conventional evaporation process, i.e. before scaling has occurred. The sacrificial layer comprises material, such as carbonate or bicarbonate of calcium or magnesium, which can be more easily removed from the pipes than the hard scale deposits which foul the surface of the heat transfer elements during the evaporation process.

Once the sacrificial layer has been formed, the evaporator is operated normally and over time the scale material will be deposited on top of the sacrificial layer (steps 2 and 3). When scaling reaches a predetermined level (for example, approximately 10% from its original value), the pipe is cleaned to remove both the sacrificial layer and the scale material (step 4). The presence of the sacrificial layer assists in the removal of the scale deposits which can be very difficult to remove from the interior of the heat transfer element when in direct contact with their surface.

Figure 3:
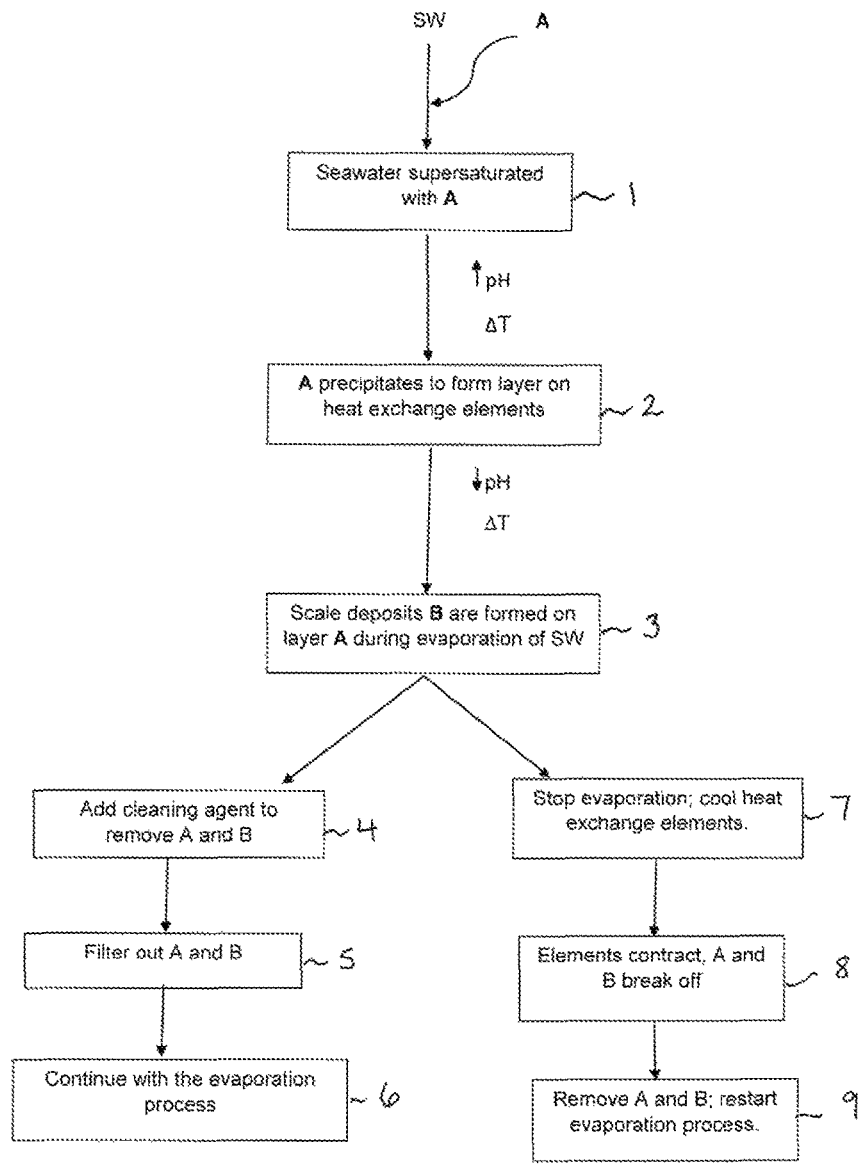
FIG. 3 is a flow diagram illustrating the steps of a preferred embodiment of the method according to the present invention.

FIG. 3 of the accompanying drawings illustrates a preferred method according to the present invention in further detail. Seawater SW is introduced into an evaporator in the conventional manner. In addition, a first material A, comprising a material that is more easily removed from a heat transfer element than scale deposits, is added to the seawater to result in the water becoming supersaturated with the sacrificial material A (step 1). Conditions are then altered, such as by means of a rise in pH and/or change in temperature, causing precipitation of the material A onto the surface of the heat transfer element to provide the sacrificial layer (step 2). Once a sufficient thickness of material has been deposited on the heat transfer element, conditions are altered again so that no further material precipitates out of solution. The standard evaporation process continues, during which scale deposits B build up on top of the sacrificial layer A (step 3).

Generally, the rise in pH of 9 or above will enable precipitation of the sacrificial material onto the heat transfer elements. However, it is to be appreciated that pH adjustment is dependent on water chemistry. The Langelier Saturation Index (LSI) is an index used in the art for indicating if scale will occur and, if so, the amount of scale which will be expected to precipitate. In the present invention, LSI should be greater than 0 to allow for precipitation to occur but then reduced to 0 or below once the sacrificial layer has been formed.

The conditions to allow for precipitation to occur may include controlling the temperature difference between an inner side of the heat transfer element in the evaporator and the outer side of the heat transfer element. This, in itself, may be sufficient to precipitate the material out of solution. However, preferably, the temperature is controlled in conjunction with a change in pH and/or the amount of sacrificial material A in the supplied water. The method may also include controlling the period of time during which operations in the evaporator take place.

Once the deposits reach a predetermined threshold, removal of the sacrificial layer A together with the scale B is effected by one of a number of potential cleaning methods, such as by steps 4 to 6 or steps 7 to 9 shown in FIG. 3. In one embodiment, an appropriate cleaning agent is added to the water that is able to penetrate through the layers of material A and B to effect removal thereof from the surface of the elements (step 4). The material is then filtered out of the solution (step 5) and the evaporation process may continue with clean heat transfer elements (step 6).

In an alternative embodiment, the evaporation process is temporarily halted, allowing the heat transfer elements to cool down and shrink (step 7). Optionally, means may be provided to accelerate cooling of the elements. This shrinkage causes the layers A and B to crack and break off the elements (step 8) and the material can be removed by suitable means, such as filtration. The evaporation process is then restarted (step 9) with clean heat transfer elements.

The sacrificial layer may comprise soft scale deposits, such as the aforementioned carbonates or bicarbonates, but it is to be appreciated that other types of material may be used for forming the layer as long as they do not interfere with the evaporation process, can be deposited onto the heat transfer element and are easier to remove from the element than the hard scale sulfate and silica deposits.

The present invention simplifies cleaning of the heat transfer pipes in an evaporator by providing a layer of material, such as carbonate or bicarbonate of calcium or magnesium, which is easier to remove beneath the scale that is deposited as a matter of course during the evaporation of sea water. The sacrificial layer can be deposited easily on the surfaces of the transfer elements by adjustment of the operating conditions and an optional supply of the sacrificial material without any modification to the existing evaporator apparatus. This enables the pipes to be cleaned while the evaporation continues to operate or allows for a shorter shutdown time, both of which reduce operating and maintenance costs.

The invention claimed is:

1. A method of cleaning an evaporator that includes at least one heat transfer element for evaporation of water, the method comprising: forming a sacrificial layer of a first material on a surface of the at least one heat transfer element; evaporating water that includes a second material to deposit the second material on top of the sacrificial layer; and removing both the sacrificial layer formed on the at least one heat transfer element and the second layer formed on top of the sacrificial layer; wherein the first material is more easily removed from the at least one heat transfer element than the second material; wherein forming the sacrificial layer on a surface of the evaporator at least one heat transfer element comprises supplying water to an evaporator in operation, wherein the supplied water includes the first material; wherein the first material is provided in supersaturation for precipitation on the at least one heat transfer element until the sacrificial layer is formed in a desired thickness; further comprising raising a pH level of the supplied water comprising the first material to facilitate precipitation of said first material.

2. The method according to claim 1, wherein the pH is raised to 9 or above and/or to provide a Langelier Saturation Index greater than 0.

3. The method according to claim 1, further comprising adding the first material to the supplied water to increase a concentration of the first material in the supplied water and facilitate precipitation of the first material.

4. The method according to claim 1 further comprising controlling a temperature difference between an inner side of the at least one heat transfer element in the evaporator and an outer side of the at least one heat transfer element to facilitate precipitation of the first material.

5. The method according to claim 4, wherein operating conditions for the method include controlling a temperature of the at least one of heat transfer element, a vapor that is being created during the operation of the evaporator, and the supplied water comprising the first material.

6. The method according to claim 4, wherein operating conditions for the method include controlling a period of time during which operations in the evaporator take place.

7. The method according to claim 1, wherein the first material comprises at least one of: a carbonate, bicarbonate of calcium or magnesium.

8. The method according to claim 1, further comprising, upon reaching the desired thickness, supplying further water including the first material to the evaporator, wherein the supplied further water is at least one of a) not in supersaturation with the first material and b) treated to reduce or avoid precipitation.

9. The method according to claim 1, wherein removal of the sacrificial layer and the second layer comprises supplying a chemical cleaner, wherein the chemical cleaner penetrates through the second layer to reach the sacrificial layer and remove the sacrificial layer from the at least one heat transfer element, thus removing all layers from the at least one heat transfer element into the water.

10. The method according to claim 9, further comprising removing from the water the layers removed from the at least one heat transfer element using in-line filters installed on a circulation line.

11. The method according to claim 1, wherein the removal of the sacrificial layer and the second layer comprises:
stopping operation of the evaporator; and
cooling the at least one heat transfer element whereby the element shrinks causing the first material forming the sacrificial layer to break and fall from the at least one heat transfer element together with the second layer of material.

12. The method according to claim 11, further comprising removing the sacrificial layer of material and the second layer of material that have broken and fallen from the evaporator from a chamber where the evaporator is located.

13. The method according to claim 12, further comprising restarting operation of the evaporator after the sacrificial layer of material and the second layer of material have been removed from the chamber where the evaporator is located.

14. The method according to claim 1, wherein the second material comprises at least one of sulfate and silica.

* * * * *